United States Patent
Chen

[11] Patent Number: 5,945,765
[45] Date of Patent: *Aug. 31, 1999

[54] INTERIOR STATOR ASSEMBLY FOR A BRUSHLESS MOTOR WITH EXCITING SHEETS FOR ENHANCING ROTOR-DRIVING FORCE

[76] Inventor: Shung-Hsiung Chen, No. 91, Lane 314, Min-Sheng St., Hsin-Hua Chen, Tainan Hsien, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 09/014,989

[22] Filed: Jan. 28, 1998

[51] Int. Cl.$^6$ .............. H02K 1/12; H02K 1/00; H02K 19/00; H02K 5/16

[52] U.S. Cl. .............. 310/257; 310/194; 310/164; 310/90

[58] Field of Search .............. 310/257, 254, 310/194, 258, 164, 156, 267, 90

[56] References Cited

U.S. PATENT DOCUMENTS

| | | | |
|---|---|---|---|
| 3,558,940 | 1/1971 | Chestnut et al. | 310/41 |
| 4,987,331 | 1/1991 | Horng | 310/254 |
| 5,808,390 | 9/1998 | Miyazawa et al. | 310/194 |

*Primary Examiner*—Thomas M. Dougherty
*Assistant Examiner*—Dang Dinh Le
*Attorney, Agent, or Firm*—Merchant & Gould

[57] ABSTRACT

An interior stator assembly is provided in a brushless motor which includes an exterior rotor assembly that has a fixed rotating shaft, and a bearing that connects rotatably the exterior rotor assembly to the interior stator assembly. The interior stator assembly includes a coil assembly and two silicon steel plates. The coil assembly includes a sheave which is adapted to journal the rotating shaft of the exterior rotor assembly therein, and a coil which is wound around the sheave. The sheave has two end surfaces on which the plates are fixed. Each of the plates has a ring body and a plurality of angularly equidistant exciting sheets which extend integrally and axially from a circumference of the ring body. The exciting sheets of the plates are staggered in such a manner that each of the exciting sheets of one of the plates is located circumferentially between an adjacent pair of the exciting sheets of the other one of the plates.

1 Claim, 5 Drawing Sheets

INTERIOR STATOR ASSEMBLY FOR A BRUSHLESS MOTOR WITH EXCITING SHEETS FOR ENHANCING ROTOR-DRIVING FORCE

BACKGROUND OF THE INVENTION

1. Field of the Invention

This invention relates to an interior stator assembly for a brushless motor, more particularly to a stator assembly which has a plurality of magnetically exciting sheets for enhancing the rotor-driving force of the motor.

2. Description of the Related Art

Referring to FIGS. 1 and 2, a conventional interior stator assembly 1 is shown to include a coil assembly 11 formed with a central bore 111, a metal tube 12 and two silicon steel plates 13, 14, each of which has a central hole 131, 141. The coil assembly 11 includes a sheave 112 which is adapted to journal a fixed rotating shaft (not shown) of an exterior rotor assembly (not shown) therein, and a coil 113 which is wound around the sheave 112. The metal tube 12 extends through the central bore 111 in the coil assembly 111 and is press fitted within the central holes 131, 141 in the plates 13, 14 by a machine (not shown). The plates 13, 14 act respectively as southern and northern magnetic poles. The conventional stator assembly 1 suffers from the following disadvantages:

(1) It is time-consuming to press fit the metal tube 12 mechanically within the central holes 131, 141 in the plates 13, 14.

(2) Because the thicknesses of the plates 13, 14 are relatively small, the rotor-driving magnetic force created in the motor (not shown) is reduced.

SUMMARY OF THE INVENTION

The object of this invention is to provide an interior stator assembly for a brushless motor which has a plurality of magnetically exciting sheets that can enhance the rotor-driving force of the motor.

According to this invention, an interior stator assembly is provided in a brushless motor which includes an exterior rotor assembly that has a fixed rotating shaft, and a bearing that connects rotatably the exterior rotor assembly to the interior stator assembly. The interior stator assembly includes a coil assembly and two silicon steel plates. The coil assembly includes a sheave which is adapted to journal the rotating shaft of the exterior rotor assembly therein, and a coil which is wound around the sheave. The sheave has two end surfaces on which the plates are fixed. Each of the plates has a ring body and a plurality of angularly equidistant exciting sheets which extend integrally and axially from a circumference of the ring body. The exciting sheets of the plates are staggered in such a manner that each of the exciting sheets of one of the plates is located circumferentially between an adjacent pair of the exciting sheets of the other one of the plates.

BRIEF DESCRIPTION OF THE DRAWINGS

Other features and advantages of this invention will become apparent in the following detailed description of the preferred embodiment of this invention with reference to the accompanying drawings in which.

DETAILED DESCRIPTION OF THE PREFERRED EMBODIMENT

Figure 1:
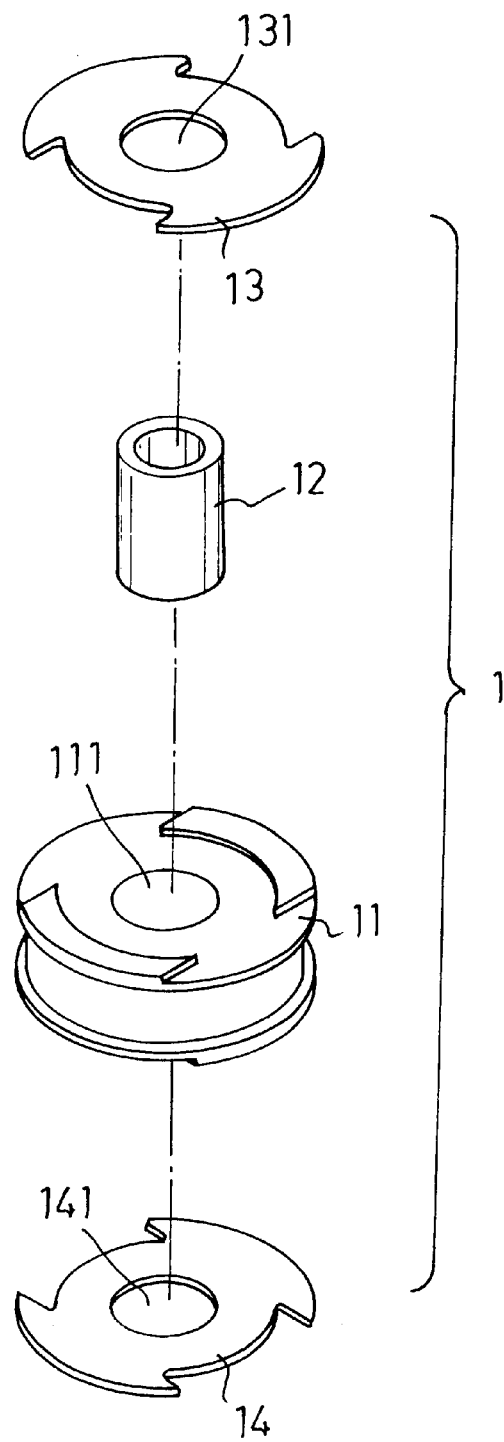
FIG. 1 is an exploded perspective view of a conventional interior stator assembly for a brushless motor.
Figure 2:
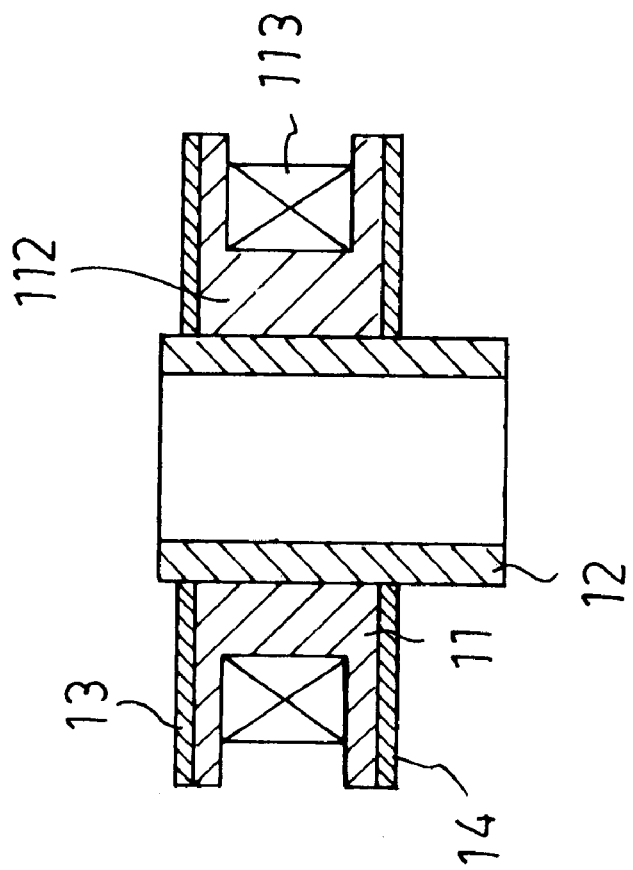
FIG. 2 is a sectional view of the conventional interior stator assembly.
Figure 3:
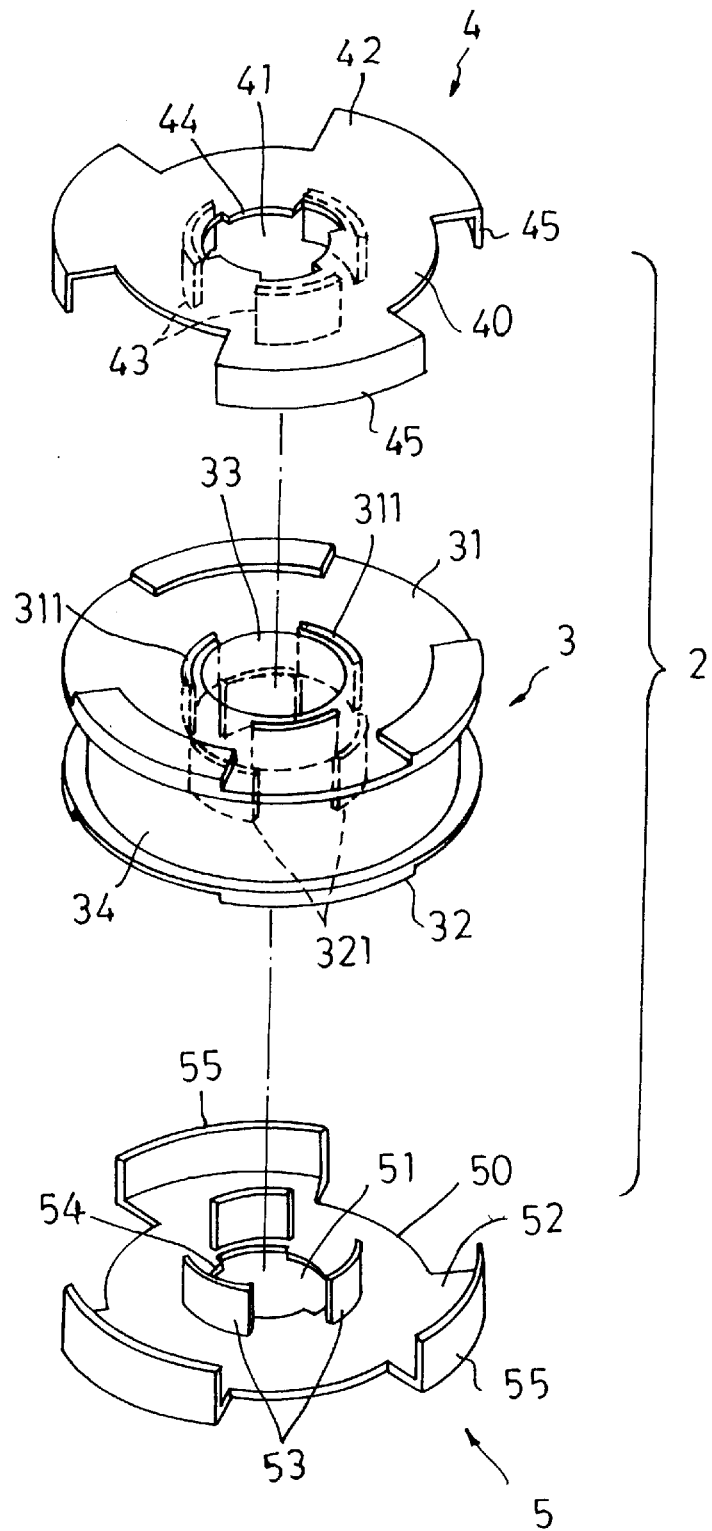
FIG. 3 is an exploded perspective view of the preferred embodiment of an interior stator assembly for a brushless motor according to this invention.
Figure 4:
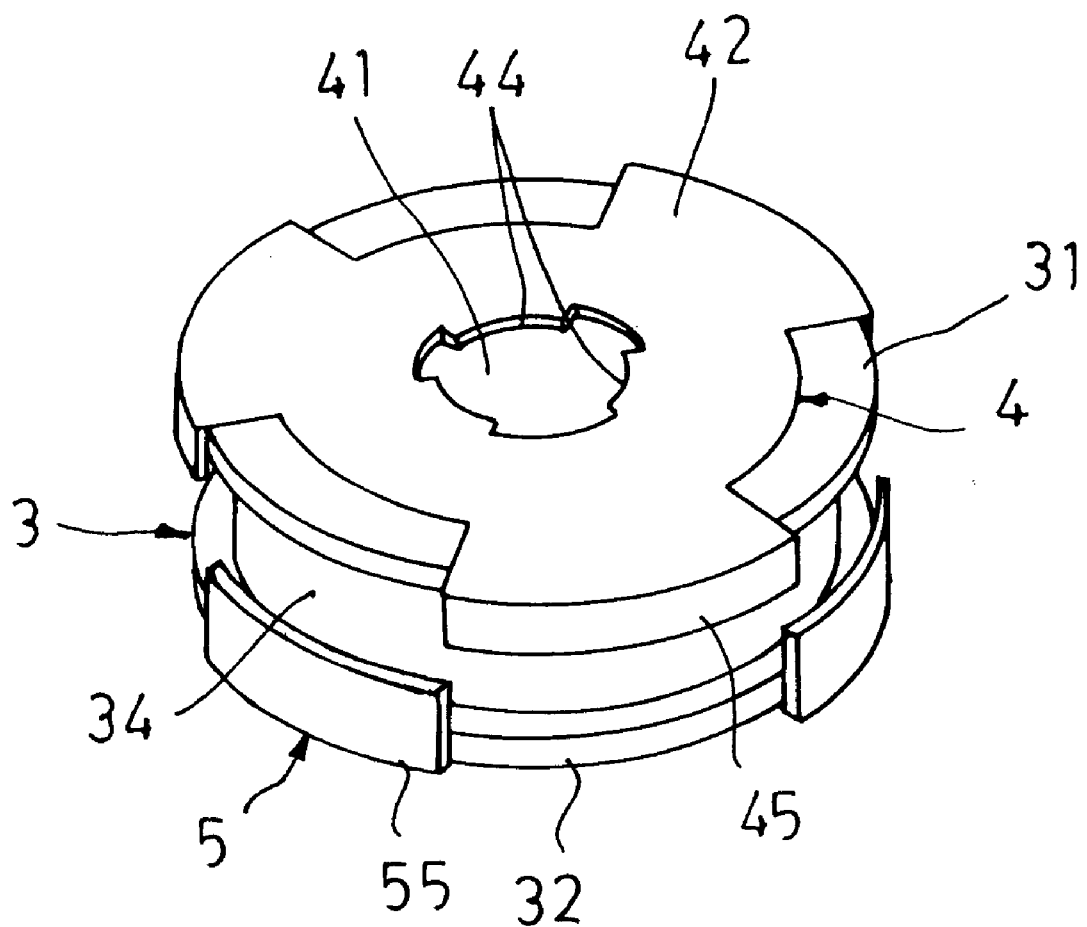
FIG. 4 is an assembled perspective view of the preferred embodiment.
Figure 5:
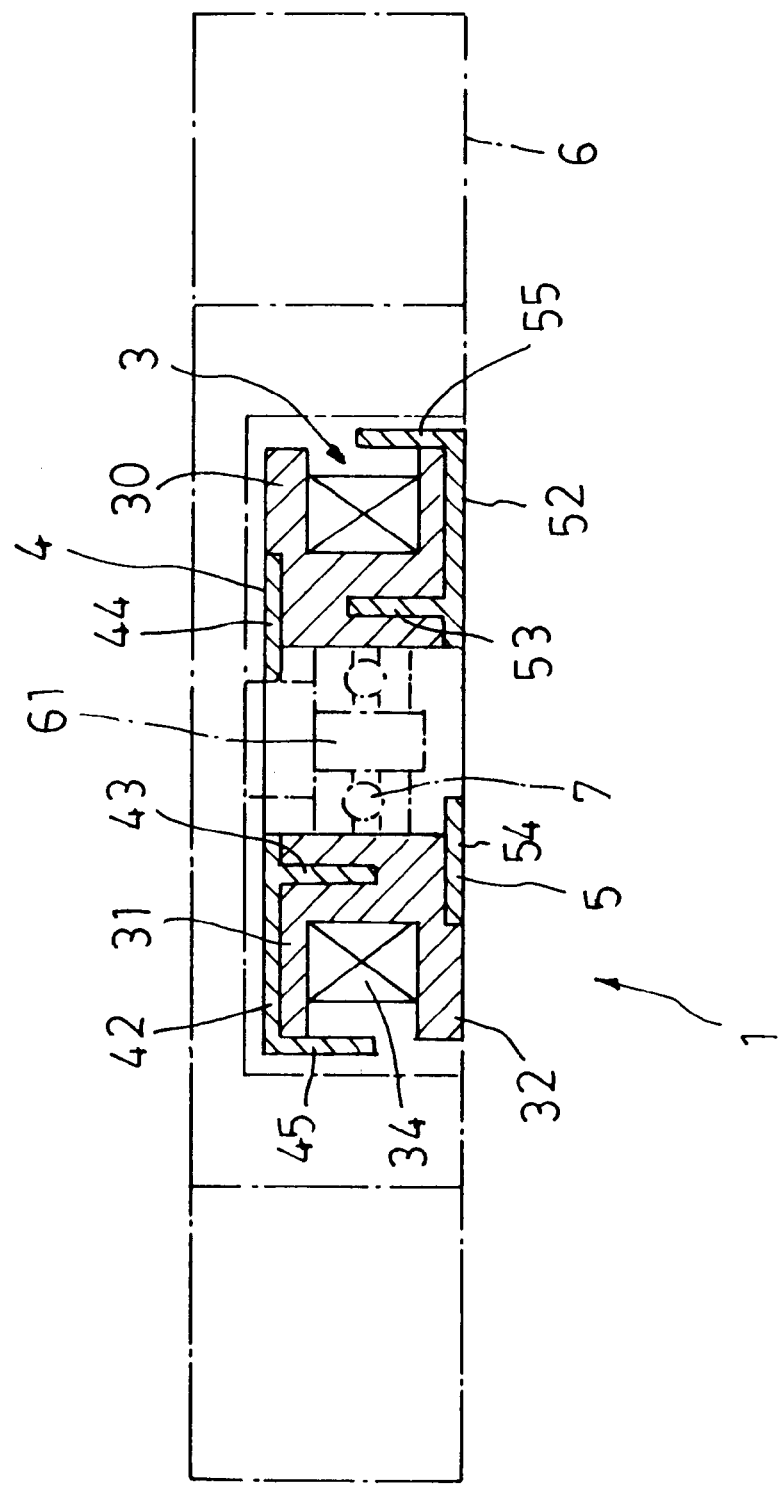
FIG. 5 is a sectional view of the preferred embodiment.

Referring to FIGS. 3, 4 and 5, the preferred embodiment of an interior stator assembly 2 is shown to consist of a coil assembly 3 and two silicon plates 4, 5. The plates 4, 5 act respectively as southern and northern magnetic poles. The coil assembly 3 includes a sheave 30 (see FIG. 5) with two end walls 31, 32 and a central bore 33, and a coil 34 which is wound around the sheave 30. The sheave 30 has two end surfaces, each of which is formed with three angularly equidistant grooves 311, 321 (see FIG. 3). Each of the grooves 311 has an axial depth that is larger than half the distance between the two end surfaces of the sheave 30.

Each of the plates 4, 5 is one piece and has a ring body 40, 50 formed with a central hole 41, 51, three angularly equidistant extensions 42, 52 extending radially and outwardly from an outer periphery of the ring body 40, 50, three insert sheets 43, 53 extending axially and inwardly from an inner periphery of the ring body 40, 50, a positioning unit consisting of three angularly equidistant positioning sheets 44, 54 extending radially and inwardly from an inner periphery of the ring body 40, 50, and three magnetically exciting sheets 45, 55 extending axially and inwardly from the outer peripheries of the extensions 42, 52. The insert sheets 43, 53 of each of the plates 4, 5 are press fitted respectively within the grooves 311, 321 in a respective end surface of the sheave 30 and have a radial length which is larger than half the distance between the plates 4, 5.

As illustrated, the insert sheets 43, 53 of the plates 4, 5 are staggered in such a manner that each of the insert sheets 43, 53 of one of the plates 4, 5 is located between an adjacent pair of the insert sheets 43, 53 of the other one of the plates 4, 5.

Similarly, the exciting sheets 45, 55 of the plates 4, 5 are staggered in such a manner that each of the exciting sheets 45, 55 of one of the plates 4, 5 is located circumferentially between an adjacent pair of the exciting sheets 45, 55 of the other one of the plates 4, 5.

As shown in FIG. 5, the interior stator assembly 1 of this invention is disposed in an exterior rotor assembly 6. The central bore 33 in the sheave 30 is adapted to dispose a ball bearing 7 therein. The ball bearing 7 connects rotatably a fixed rotating shaft 61 of the exterior rotor assembly 6 to the sheave 30, and is confined between the positioning sheets 44 of the upper plate 4 and the positioning sheets 54 of the lower plate 5, thereby preventing the movement of the bearing 7 relative to the sheave 30.

The stator assembly 1 of this invention has the following advantages:

(1) The plates 4, 5 can be mounted manually on the coil assembly 3.

(2) The exciting sheets 45, 55 can enhance the rotor-driving magnetic force of the stator assembly 1.

With this invention thus explained, it is apparent that numerous modifications and variations can be made without departing from the spirit and scope of this invention. It is therefore intended that this invention be limited only as indicated in the appended claims.

I claim:

1. An interior stator assembly for a brushless motor, the motor including an exterior rotor assembly which has a fixed rotating shaft, and a bearing which connects rotatably the exterior rotor assembly to said interior stator assembly, said interior stator assembly comprising:

a coil assembly including a sheave with two end walls and a central bore, and a coil which is wound around said sheave, said sheave having two end surfaces, each of which is formed with a plurality of angularly equidistant grooves, each of said grooves having an axial depth which is larger than half a distance between said two end surfaces of said sheave; and two silicon plates, each of which is one piece, and each of which includes:

a ring body formed with a central hole, a plurality of insert sheets which extend axially and inwardly from an inner periphery of said ring body, said insert sheets of each of said plates being press fitted respectively within said grooves in a respective one of said end surfaces of said sheave, and having an axial length which is larger than half a distance between said plates, and a plurality of angularly equidistant positioning sheets which extend radially and inwardly from said inner periphery of said ring body, said positioning sheets alternating circumferentially with said insert sheets, said insert sheets of one of said silicon plates alternating circumferentially with said insert sheets of the other one of said silicon plates.

* * * * *